455/3

Jan. 31, 1956 J. B. MAGGIO 2,733,296

AUTOMATIC LINE SWITCHING CIRCUITS

Filed Sept. 13, 1952 4 Sheets-Sheet 1

INVENTOR
J. B. MAGGIO
BY George C. Lord
ATTORNEY

INVENTOR
J. B. MAGGIO
BY George C. Lord
ATTORNEY

RECEIVING STATION

INVENTOR
J. B. MAGGIO
BY George P. Ford
ATTORNEY

AUTOMATIC LINE SWITCHING CIRCUITS

Filed Sept. 13, 1952 4 Sheets-Sheet 4

INVENTOR
J. B. MAGGIO
BY George C. Lord
ATTORNEY 2,733,296

AUTOMATIC LINE SWITCHING CIRCUITS

John B. Maggio, Summit, N. J., assignor to Bell Telephone Laboratories, Incorporated, New York, N. Y., a corporation of New York Application September 13, 1952, Serial No. 309,447

15 Claims. (Cl. 179—15)

This invention relates to automatic switching systems and more particularly to systems for substituting spare channel facilities for working channel facilities in the event of transmission failure of a working channel in one or more links of a multilink relay system.

In transmission systems involving terminal stations and a plurality of intermediate repeater or relay stations, failure or significant degradation of transmission in any interstation link disables the entire system. Where such systems are employed for multiplex message communication or for the transmission of television signals, such a failure assumes serious proportions and the provision of spare facilities becomes economically justified. Although repeater systems and particularly coaxial and radio relay systems have heretofore been provided with spare facilities and also with either manual or in some cases automatic devices for substituting the spare facility for failed sections of the working facility, it has become desirable to provide automatic switching systems capable of rapid operation to minimize working channel outages and to reduce to the greatest possible extent the requirements for interstation auxiliary control circuits associated with the automatic switching system.

While the present invention is of particular advantage when used in conjunction with microwave radio relay systems of the type employed for transcontinental transmission of multiplex telephone and television signals and specifically of the type described in an article entitled "The TD-2 microwave radio relay system" by Roetken, Smith and Friis, published in the Bell System Technical Journal for October 1951, beginning at page 1041, it is of general application to multilink communication systems.

In the radio relay system described in the article referred to above, so-called terminal stations are joined by radio channels passing through a number of intermediate relay points. The message waves which fall in the video frequency band are applied to frequency modulation equipment at the transmitting terminal to modulate a 70 megacycle ("intermediate frequency") carrier. This carrier is heterodyned up to a frequency of the order of 4,000 megacycles for microwave radio transmission and at repeater points the received wave is reduced to the intermediate frequency, amplified at that frequency and then increased again to a microwave frequency for retransmission. Ultimately the modulated intermediate frequency signal is recovered at the receiving terminal and is demodulated to recover the message intelligence. Interruption of transmission over such a system can be caused either by equipment failure or by fading which results from varying atmospheric conditions.

It is convenient in the application of automatic switching to such a system to isolate for switching purposes switching sections including either a terminal station, a number of intermediate repeater stations and a so-called main station which comprises a repeater station provided with switching equipment, or two main stations and the repeater stations between them. In either case the problem contemplated by the invention involves the recognition at the receiving end of a switching section of the failure of any one of a plurality of message or working channels in that section and the automatic substitution in that section of a spare and normally unused message channel for the channel facility in which the failure has occurred.

In accordance with the invention therefore, an automatic switching circuit is provided for a communication system which includes transmitting and receiving stations, at least one working channel linking these stations through intermediate repeater stations and a spare or protection channel also linking these stations. Switches are provided at the transmitting and receiving stations for automatically substituting the spare channel for any working channel if failure of transmission thereover occurs. The equipment for controlling the switches involves means at the transmitting station for applying a first pilot signal to each working channel and for applying a second pilot signal to the spare channel. Circuits at the receiving station for each working channel are operative in response to a predetermined change in some characteristic of the pilot signal transmitted over that working channel for actuating the switch at the transmitting station to connect or bridge the spare channel equipment to the failed working channel. At the receiving station circuits associated with the spare channel and responsive to the change in pilot frequency brought about by the connection of a spare channel to the failed working channel at the transmitting station actuate the switch at the receiving station to substitute the output of the spare channel for that of the working channel.

This switching system contemplates the application of pilot signals to each of the working channels and to the spare channel. Ordinarily this is accomplished at transmitting terminals at which the pilot signals may be applied as modulating signals to the modulating equipment there provided. Since, however, several switching sections may be employed between terminal locations, and since the main repeater stations at the ends of the individual switching sections need not include modulation equipment, failure of a working channel and the resultant use of the spare channel in one switching section removes the pilot signal from the spare channel in succeeding switching sections.

Also in accordance with the invention, therefore, the necessity of providing modulating equipment at main switching stations intermediate the terminal stations for the purpose of resupplying pilot signals to the spare channel is avoided by applying to the system at the repeater point terminating the section in which a switch has occurred two single frequency tones of frequencies falling within the intermediate frequency band (of signals present at the repeater) and differing by the desired pilot frequency. One of these tones is adjusted to be of considerably greater amplitude than the other, and the two beat together in any non-linear portion of the succeeding system in such a way that the smaller in amplitude both frequency and amplitude modulates the greater at the difference frequency. At the next station having switching apparatus this modulation is recovered in the same way as the pilot signals normally applied at terminal stations.

The above and other features of the invention will be described in detail in the following specification taken in connection with the drawings in which.

Figure 1:
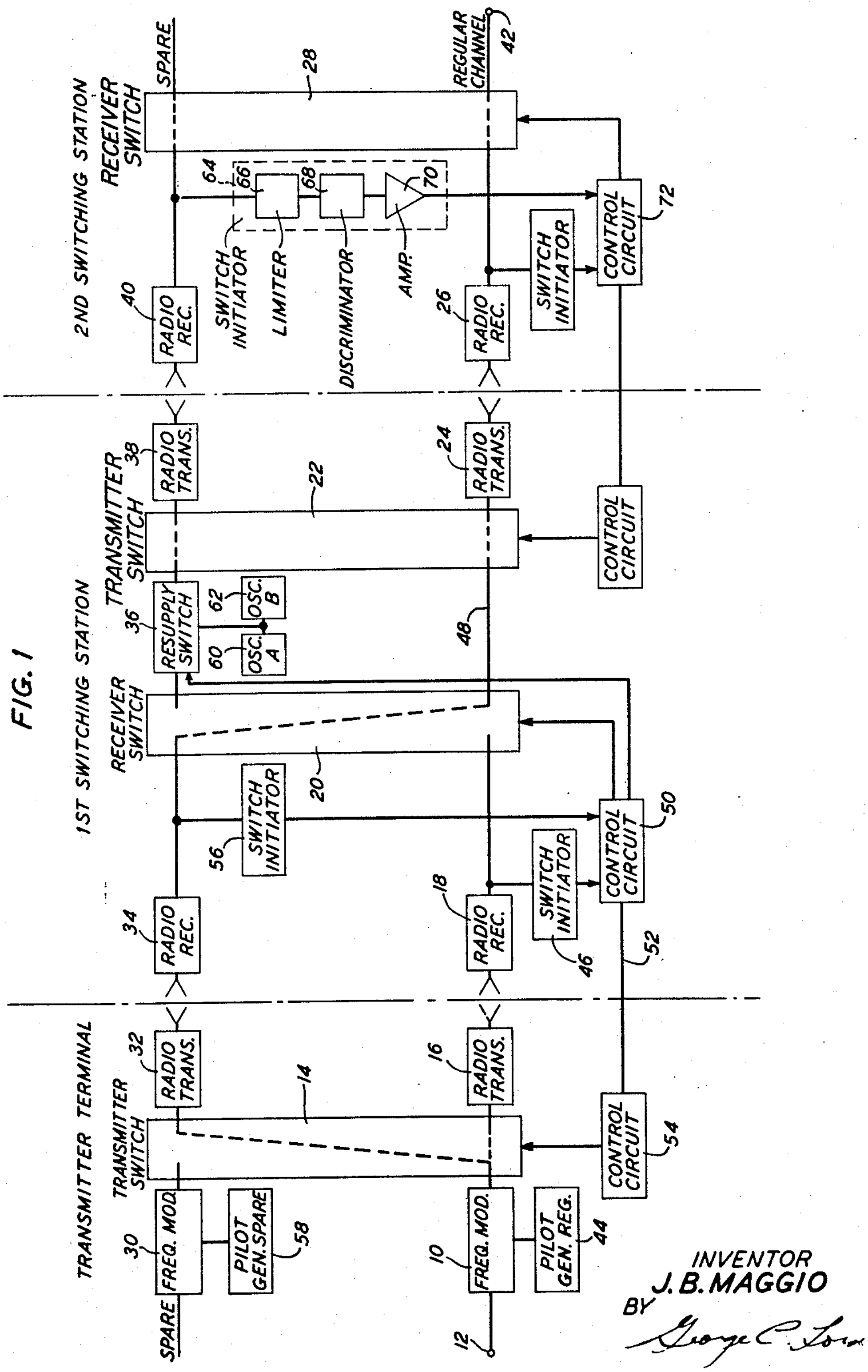
Fig. 1 is a block diagram of a switching system according to the invention illustrating the circuit arrangements for two switching sections including a transmitting station and two main switching stations.

The system illustrated in Fig. 1 includes a transmitting terminal, an intermediate switching station and a second switching station connected by radio channels. For the purpose of simplification intermediate repeater stations normally provided in the transmission paths between these stations are omitted as they do not include any of the switching apparatus of the invention. It will be understood, however, that the paths between each of the stations shown may include from one to six or more repeater stations as required to provide switching sections of convenient length. Further the system shown in Fig. 1 follows in general the arrangement of the TD–2 radio relay system described in the article by Roetken, Smith and Friis referred to above although only a single working channel and a spare channel are shown. It will be understood, however, that the automatic switching system of the invention may be and preferably is employed with relay systems having plurality of working channels and may be so arranged as to substitute the spare channel for any one of a relatively large number of working channels. In one convenient arrangement according to the invention a spare channel is provided as protection for five working channels although in some cases and depending upon the transmission characteristics and the nature of the equipment employed it may be desirable to provide a spare channel to protect either a larger or a smaller number of working channels.

The single working channel shown in Fig. 1 is typical and at the transmitting terminal includes frequency modulator 10 arranged to accept over input lead 12 message signals falling in the video frequency band and to produce a frequency modulated wave having a center frequency of convenient value as for example, 70 megacycles. This frequency corresponds to the intermediate frequency of the radio transmission system and is the frequency at which the radio signal is amplified at repeater points. The output of the frequency modulator 10 is applied through a transmitter switch 14, the details of which will be considered hereinafter, to a radio transmitter 16 which includes circuits for translating the center frequency to a value of the order of 4,000 megacycles, for example, for transmission over a signal path which may include a number of intermediate repeater stations at each of which the microwave signal is received, reduced to the intermediate frequency amplified, translated to a microwave frequency differing from that received at that station, and reradiated.

After traversing a switching section, the microwave signal reaches a main or switching station and is reduced to the intermediate frequency by a radio receiver 18. The intermediate frequency signal is applied to a receiver switch 20 similar to the transmitter switch 14 and thence through certain intermediate circuits and a transmitter switch 22 to a radio transmitter 24. From this point the communication path extends through a number of repeater stations (not shown) to another switching station including a radio receiver 26 and a receiver switch 28 similar to the corresponding elements at the first switching station.

All of these elements except the transmitter and receiver switches are duplicated for each working channel. The transmitter and receiver switches are used in common by the several working channels and the spare channel and normally interconnect the working channel elements in the order described.

The spare channel equipment is the same as that provided for a working channel and includes in order a frequency modulator 30, a radio transmitter 32 which may be connected thereto through the transmitter switch 14 and a radio receiver 34 at the first switching station which may be connected through receiver switch 20, a re-supply switch 36 and thence through transmitter switch 22 to a radio transmitter 38. At the second switching station the spare channel equipment includes a radio receiver 40, the output of which is connected to receiver switch 28.

The normal path of message wave signals through the equipment of Fig. 1 has been described. The connections indicated by dashed lines in transmitter switches 14 and 22 and receiver switches 20 and 28 are those which exist when the regular or working channel extending between the terminal station and the first switching station has failed and the spare channel has been substituted therefor, it being assumed that the regular channel is operative between the first switching station and the second. Under these conditions a message wave applied over lead 12 traverses the modulator 10 of the working channel and the spare radio transmitter 32 which is bridged on the regular channel equipment in the switch at the terminal station; the spare radio receiver 34, the receiver switch 20, the transmitter switch 22 and the working channel radio transmitter 24 at the first switching station; working channel radio receiver 26 and receiver switch 28 at the second switching station and appears upon the regular channel output lead 42.

It is now necessary to consider the apparatus provided according to the invention for determining when a failure has occurred on a working channel and for controlling the necessary transmitter and receiver switches for the purpose of substituting the spare channel equipment for the working channel equipment in the affected switching section. For this purpose a pilot generator 44, which may comprise a simple oscillator, is associated with the modulating equipment for each working channel. Conveniently the frequency of the pilot signal is chosen to fall at one extreme of the frequency band of the message wave signals and may, for example, be of the order of 8 megacycles per second. This pilot signal is applied to the frequency modulator at the terminal station and appears whether or not a message wave is present as a tone modulated upon the intermediate frequency carrier applied to the radio transmitter.

Assuming for the moment that no failure of the working channel has occurred, the output of the modulator 10 including the pilot signal modulated upon the intermediate frequency carrier is applied through transmitter switch 14 to radio transmitter 16 and thence transmitted to radio receiver 18 located at the switching station at the receiving end of the first switching section. The output of radio receiver 18 comprising the intermediate frequency carrier modulated by at least the output of pilot generator 44 and possibly also by message waves applied at the terminal station is applied to receiver switch 20 and also to a circuit identified as a switch initiator 46. This circuit comprises essentially a frequency modulation receiver having at least a limiter and a discriminator and also includes circuits for detecting the presence in the demodulated signal of the pilot tone and for indicating the noise energy contained in a band of frequencies centered upon the pilot signal frequency and for example approximately 100 kilocycles in width. If the pilot tone fails to be received or if the ratio of pilot tone to noise in the band of frequencies just referred to decreases to a predetermined value, the switch initiator 46 produces an output signal for application to a control circuit 50. This control circuit, acting in response to the output of the switch initator, transmits a control signal identifying the failed working channel over a return path facility 52 to a second control circuit 54 located at the transmitting end of the switching section and arranged to actuate transmitter switch 14. The return path facility need not necessarily follow the same route as the communication system radio channels and may comprise any type of transmission facility capable of transmitting the control signals to the transmitting end of the switching section. For the sake of simplicity, voice frequency wire lines are indicated in the drawing as linking the respective pairs of control circuits.

Since no useful purpose would be served by operating the transmitter and receiver switches to substitute the spare channel radio equipment for that of the working channels unless the spare equipment can effect an improvement in transmission, operation of control circuit 50 is made contingent upon satisfactory receipt of a pilot signal over the spare channel. For this purpose a switch initiator 46 is associated with spare radio receiver 34 at the receiving end of the first switching section. Switch initiator 56 includes two channels each similar to the one found in switch initiator 46 described above, one of these channels being responsive to the pilot signal to be employed upon the spare channel and the other to the pilot signal employed upon the working channel or channels.

The pilot signal for the spare channel is provided by a pilot generator 58, similar to pilot generator 34, associated with the frequency modulator 30 for the spare channel. Under normal circumstances this pilot signal, the frequency of which differs from that of the pilot signal employed on the working channels and may for the purposes of the present example be 9 megacycles per second, appears as modulation upon an intermediate frequency carrier which is applied to radio transmitter 32 and appears at the output of spare radio receiver 34 at the first switching station. If transmission over the spare channel is satisfactory an output indicating this fact will be produced in the appropriate channel of switch initiator 56 and this information is utilized in control circuit 50 effectively to indicate that a switch to the spare channel will produce an improvement in the transmission.

Under these circumstances, the signal transmitted over path 52 to control circuit 54 causes operation of transmitter switch 14 to connect the output of the working channel modulator 10 to the input of radio transmitter 32 as indicated by the dashed line. When the spare transmitter is thus bridged on the line from the working channel modulator the pilot frequency appearing at the output of radio receiver 34 and applied to switch initiator 56 changes from the 9 megacycle signal provided by pilot generator 58 to the 8 megacycle signal provided by pilot generator 44 associated with the working channel. This change in pilot frequency is detected by switch initiator 56 which produces an output in response to the 8 megacycle pilot indicating that the switching operation has been completed at the transmitter station. This information when applied to control circuit 50 is employed to effect operation of receiver switch 20 to connect the output of radio receiver 34 over transmission line 48 and through transmitter switch 22 which is assumed to be in its normal condition to radio transmitter 24 associated with the working channel. The working channel equipment which failed in the first switching section is thus by-passed by way of the spare channel and the system is restored to service within a few milliseconds. It will be seen from the above that operation of the switching equipment at the head or sending end of the switching section is verified and the operation of the receiving and switching equipment is initiated by the change in the frequency of the pilot signal transmitted over the spare channel which occurs when the working channel modulator 10 is connected to the spare channel by operation of transmitter switch 14.

As can be seen from Fig. 1 no frequency modulation equipment is located at the first switching station and it is not possible to apply a pilot signal to the spare channel in the succeeding switching sections by the method employed at the transmitting terminal station. Furthermore, as soon as the spare channel extending between the terminal station and the first switching station is seized to make good a failed working channel between these points, the source of pilot frequency 58 for the spare channel is disconnected from the succeeding sections of the spare channel circuit. Accordingly if it be desired to avoid tying up the spare channel in all succeeding switching sections of the system (because the absence of pilot signal will incorrectly indicate that the spare is out of order) some means must be provided for resupplying the necessary pilot signal to the spare channel in succeeding sections. This is accomplished according to the invention without the necessity of providing frequency modulators at each intermediate switching station.

As shown in Fig. 1, the spare channel output of receiver switch 20 is normally connected to the spare channel input of transmitter switch 22 at the first switching station through a resupply switch 36 which completes a transmission path between these points over which the spare channel pilot signal is applied to the next succeeding switching section. When the spare channel is switched, however, control circuit 50 actuates the resupply switch 36 to open the spare channel circuit from receiver switch 20 and at the same time to connect the outputs of a pair of oscillators 60 and 62 to the spare channel input of transmitter switch 22. These oscillators are of conventional type and are arranged to operate at frequencies falling within the intermediate frequency band of the transmission system and differing by the frequency of the spare channel pilot signal. Thus if a 70 megacycle intermediate frequency is assumed as above, oscillators 60 and 62 may conveniently be tuned to frequencies of 61 and 70 megacycles respectively, differing by the 9 megacycle value assumed for pilot generator 58 associated with the spare channel. Preferably one of these frequency components is of larger amplitude than the other although it is not essential that any particular relationship exist between the two amplitudes so long as the frequency modulation of one by the other produced by the mechanism described below is sufficient to produce a pilot signal at the next initiator of sufficient amplitude to meet the switching standards referred to above.

These two frequencies are transmitted over the system and appear at the output of radio receiver 40 at the next switching station as intermediate frequency signals. At this point the two components are applied to switch initiator 64. This switch initiator is the same as those employed at the other stations and as has been indicated above includes at least a limiter 66, a discriminator 68 and an amplifier 70. The limiter 66 which may be of conventional type is inherently a non-linear circuit. In this non-linear circuit the 61 and 70 megacycle outputs of oscillators A and B beat together the effect being such that the frequency component of greater amplitude is both amplitude and frequency modulated by the difference frequency of 9 megacycles. This may be explained by considering the larger component as a vector rotating at the frequency of that component and the smaller component as a vector rotating about the end of the first vector at the second frequency. The vector representing the sum of the two will be accelerated and decelerated and changed in amplitude at the difference frequency. The variation in amplitude is suppressed by the limiter, leaving a frequency modulated component. The discriminator of the switch initiator detects the modulating frequency and produces an output of the pilot frequency for the spare channel which actuates a control circuit 72 at the second switching station in the same way as though the spare channel pilot had been received over the radio system from the transmitter terminal.

Figure 2:
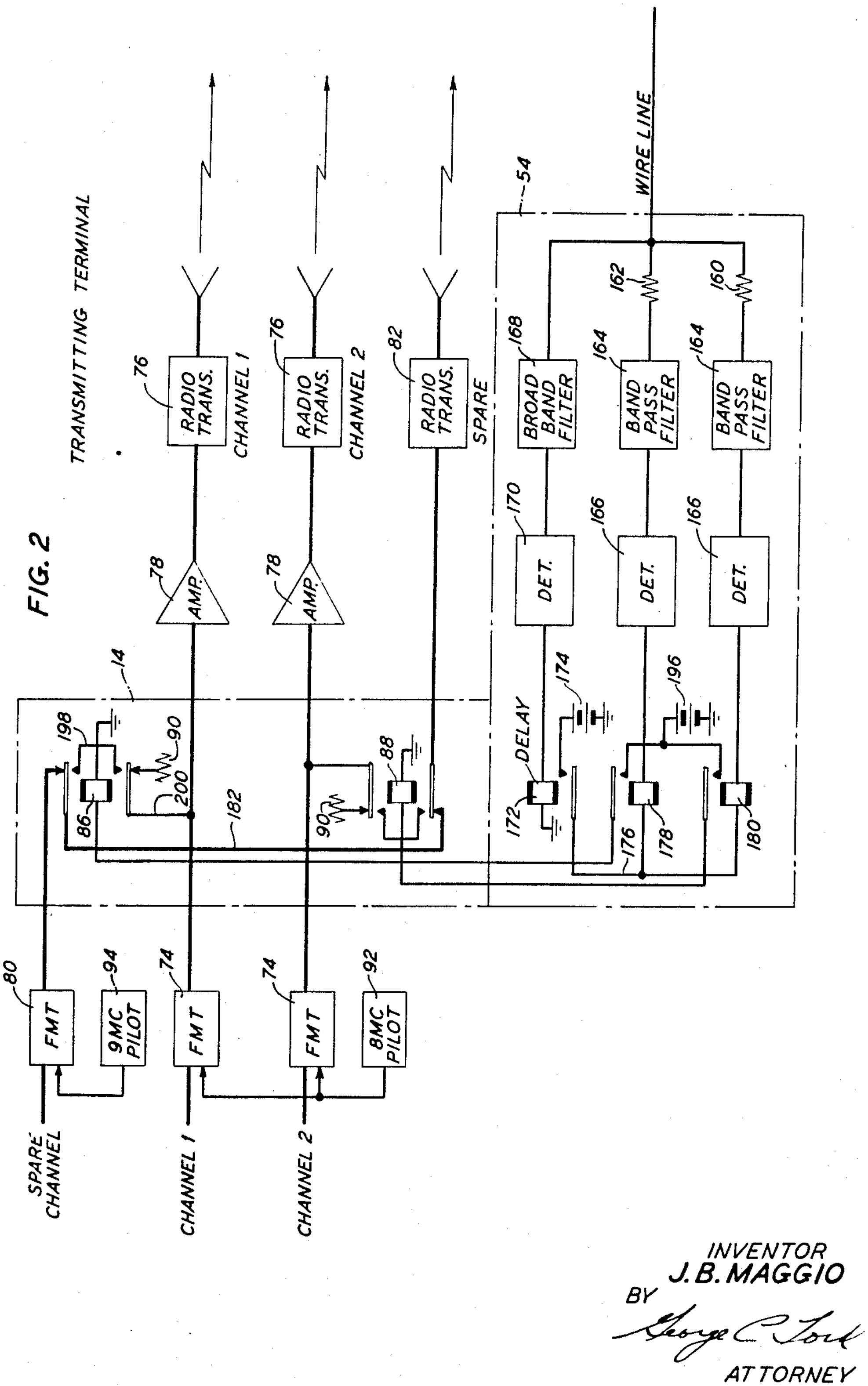
Fig. 2 is a diagram partially in block form illustrating in greater detail the equipment provided according to the invention at a transmitting terminal.
Figure 3:
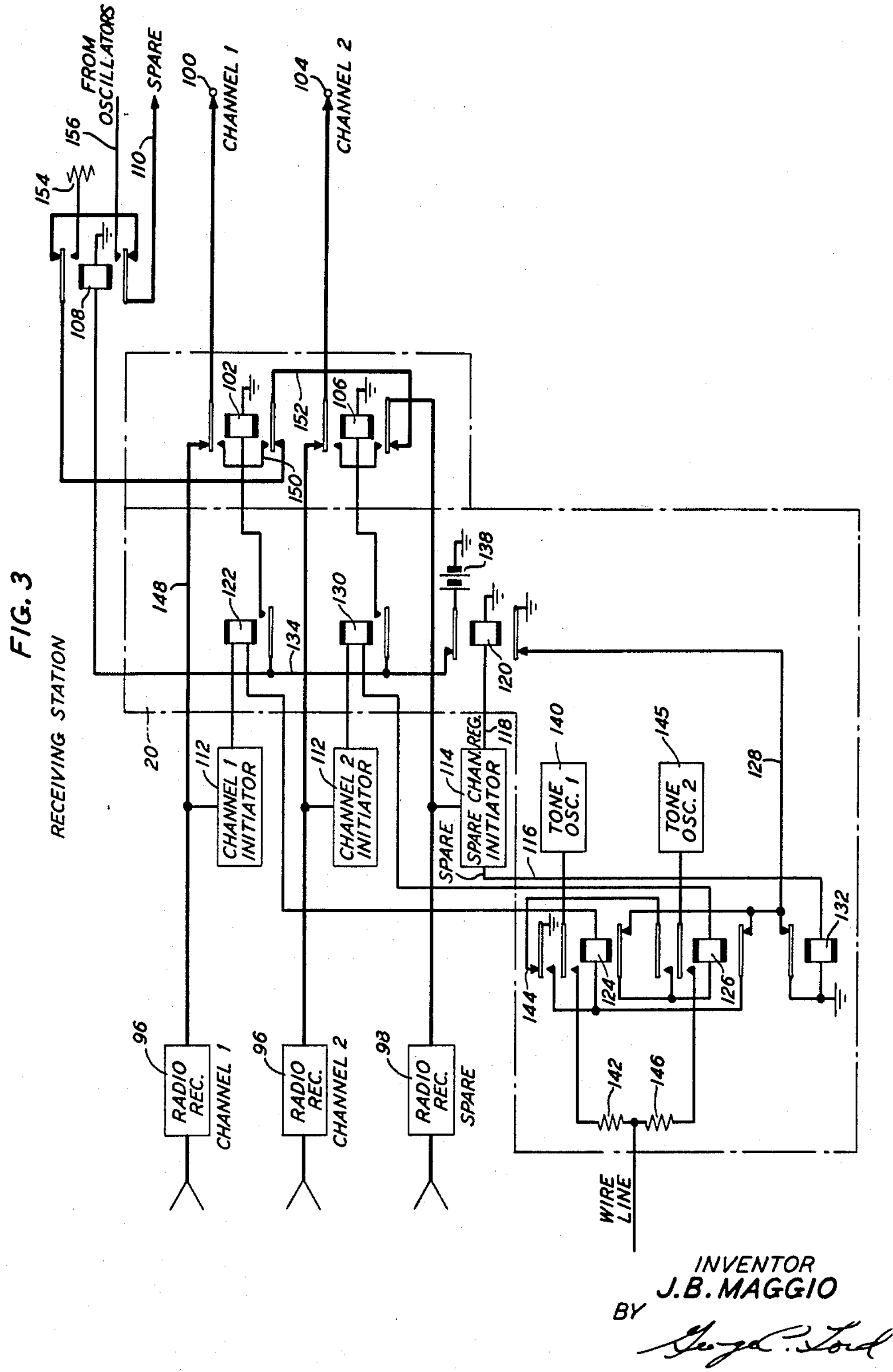
Fig. 3 is a similar diagram partially in block form of the equipment provided at the receiving end of a switching section.

The details of the switching system circuits for a single section comprising those at a transmitter terminal station and at a receiving station will be considered with reference to Figs. 2 and 3 (with Fig. 3 placed to the right of Fig. 2) which illustrate the switching circuits shown only schematically in the block diagram of Fig. 1. Although the circuits illustrated in Figs. 2 and 3 involve two working channels identified as channel 1 and channel 2 and a spare channel, while the block diagram of Fig 1 shows only a single working channel the two are fully equivalent, it being obvious that in Fig. 1 additional working channels would be connected in circuit in the same manner as that shown and that only individual radio transmitters, radio receivers and switch initiator units would be required in addition to those shown.

Each of the working channels includes at the terminal station (Fig. 2) a frequency modulator 74 the output of which is connected to a microwave radio transmitter 76 through a branching amplifier 78 which serves to isolate this circuit from the switching circuits to be described below. Under normal conditions each of the frequency modulators for a working channel is connected to the corresponding amplifier and transmitter and the output therefrom is radiated over the radio relay system. The frequency modulator 80 for the spare channel is connected through the several contacts of the transmitter switch 14 to the spare radio transmitter 82 and under normal conditions is employed either for low priority message transmission or merely as a standby facility. As shown in Fig. 2 the signal circuit extending between the frequency modulator 80 and the spare channel transmitter 82 extends through the upper normally closed or back contact of a transmitter switch for channel 1 thence through the lower normally closed contact of a similar transmitter switch 88 associated with channel 2. While these switches are shown schematically as conventional relay devices each having two pairs of transfer contacts it will be understood that depending upon the operating frequency involved special types of contacts may be required.

Examination of the circuits associated with transmitter switch 86 will indicate that under normal conditions a branch circuit extending from the output of the frequency modulation equipment 74 of channel 1 is terminated through the lower normally closed contact of transmitter switch 86. A similar branch circuit associated with channel 2 is terminated through the upper normally closed contact of transmitter switch 88. The terminations indicated schematically in Fig. 2 as resistors 90 are so arranged that the branch circuits do not interfere with transmission over the working channels under normal conditions of operation.

The pilot signals referred to above in connection with the description of the block diagram of Fig. 1 are provided by two oscillators. An 8 megacycle oscillator 92 is arranged to provide a pilot signal for application to the input of the frequency modulator for each of the working channels while a similar oscillator 94 provides a 9 megacycle pilot signal for application to frequency modulator 80 of the spare channel. It will be understood therefore that under normal conditions message waves together with a superimposed 8 megacycle pilot signal are transmitted over channels 1 and 2 while at least a 9 megacycle pilot signal is transmitted over the spare channel. Since the pilot frequencies may be chosen to fall at one extreme of the pass band of the modulators and to have values not within the band of message signal frequencies, the pilot signals need not interfere with message waves transmitted over the same channel.

The arrangement of the switching circuits at the receiving end of a switching section is quite similar to that at the head or transmitting end and is shown in Fig. 3. Here the microwave signals are received by radio receivers 96 for the working channels 1 and 2 and by radio receiver 98 for the spare channel. The intermediate frequency output of the radio receiver for channel 1 is applied to an output terminal 100 through the upper back contact of a receiver switch 102. Similarly the intermediate frequency output of radio receiver 96 for channel 2 is applied to an output terminal 104 through the upper back contact of a receiver switching relay 106. It will be understood that from terminals 100 and 104 the intermediate frequency signals may be applied either to frequency modulation receiving equipment or to the inputs of a transmitter switch for a succeeding switching section.

The signal path for the spare channel at the receiver terminal extends through the lower back contact of receiver switch 106 associated with channel 2 thence through the lower back contact of receiver switch 102 associated with channel 1, thence through the upper back contact of a switch 108 and the lower back contact of the same relay to an output lead 110. The signal appaearing on this output lead is applied to subsequent circuits in the same way as those appearing at terminals 100 and 104. The circuit connections just described are those which exist in the absence of difficulty on any working channel. As has been indicated in the block diagram of Fig. 1 a switch initiator 112 is associated with the output of each of the working channel radio receivers 96 and a similar switch initiator 114 is connected to the output of the spare channel radio receiver 98. These circuits are arranged to detect failure of the pilot signal transmitted over the associated channel and are sensitive either to reduction in the level of a pilot signal below a specified value or to reduction of the ratio of the pilot signal to the noise occurring in a band of frequencies centered upon the pilot frequency as a carrier below a predetermined value. If the received signal fails to satisfy either or both of these conditions, the switch initiator produces a direct current output.

As has been stated above switch initiator 114 associated with the spare channel includes parallel circuits, one arranged to provide a direct current output if the spare pilot signal normally transmitted over the spare channel fails to meet the established values and the other arranged to produce a similar output if the working channel pilot signal which is transmitted over the pilot channel when the pilot channel is substituted for a working channel in the course of a switching operation fails to meet the specified values. It is the direct current output signals from the switch initiators 112 and 114 which control all of the switching operations. Reference is therefore made to the block diagram of Fig. 4 illustrating the circuit details of the switch initiator 114.

Figure 4:
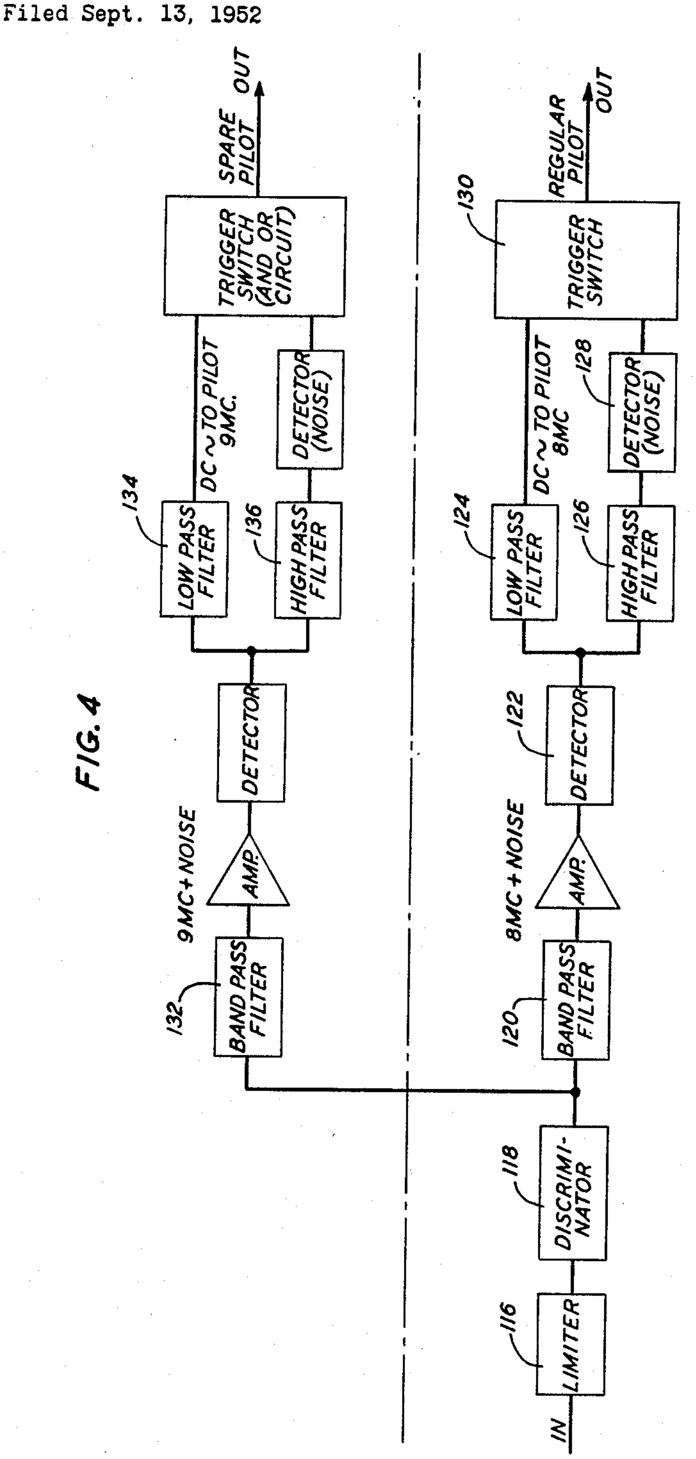
Fig. 4 is a block diagram illustrating details of the switch initiator circuits shown in Fig. 3.

The switch initiator circuit illustrated in Fig. 4 is arranged for use with the spare channel at the receiving end of a switching section. The switch initiators for the working channels are somewhat simpler and comprise only those portions of the circuit shown beneath the dashed line of the drawing. It will be understood that the signals applied to the switch initiator circuit are at the intermediate frequency employed in the radio relay system and comprise a carrier which is frequency modulated by message information to be transmitted and in addition by the appropriate single frequency pilot signal. As has been indicated above it is desired to obtain from this input a direct current output signal whenever the level of the pilot frequency tone drops below a predetermined value or whenever the ratio of the pilot frequency to the noise energy included in a band of frequencies centered upon the pilot frequency falls below a predetermined value. The output of the microwave radio receiver is therefore applied first to a limiter 116 and thence to a discriminator 118. These elements may be of the usual type employed in frequency modulation receivers and provide a demodulated output corresponding to the input signals applied to the frequency modulation terminal at the transmitting end of the switching section.

In the switch initiators for the working channels (to which the present description will be limited for the moment) this output is applied to a band-pass filter 120 arranged to pass the 8 megacycle pilot frequency employed on the working channels and a band of frequencies approximately 100 kilocycles wide, centered upon the 8 megacycle pilot frequency. The output of this filter is amplified and applied to a detector 122. The output of the detector is applied to two branch circuits, one of which includes a low-pass filter 124 which acting with the detector produces a direct current proportional to the amplitude of the 8 megacycle pilot tone. The other branch includes a high-pass filter 126 which passes without substantial alteration the noise components centered upon the pilot frequency as a carrier and a second detector 128 which acts to produce a direct current output voltage proportional to the amplitude of the noise components in the band chosen. The direct current outputs in these two branches are applied to a trigger switch 130. This may be a conventional Eccles-Jordan or flip-flop circuit having two conditions of stable operation and comprising a pair of triode tubes with a common cathode circuit and individual anode and grid circuits, there being cross-connections between the anodes and grids of the two tubes. A circuit of this type is shown at page 354 of "Theory and Application of Electron Tubes" by H. J. Reich, McGraw-Hill 1944. The output of filter 124 is applied to the grid of one tube and that of detector 128 is applied to the grid of the other tube. The operating conditions are so chosen that when the pilot is of satisfactory amplitude and the noise energy is within specified limits current flows through one tube. If, however, the pilot amplitude decreases or the noise amplitude increases (decreasing the signal to noise ratio) the circuit will switch to the other condition of stability, and current will flow through the second tube. Relays may be connected in circuit to be operated whenever current flows through the second tube, thus providing an indication that the associated channel has failed.

In addition to the elements thus far described, the switch initiator for the spare channel includes elements arranged to test the spare pilot output according to the same switching criteria. Such information is necessary in order to prevent operation of the switching equipment in the event that the spare channel is itself unsatisfactory since no improvement would be obtained by substituting it for an unsatisfactory working channel. The additional elements required for this purpose comprise basically a parallel detection circuit similar in all respects to that following the discriminator 118 in the working channel switch initiator. A band-pass filter 132 having pass band centered at 9 megacycles rather than 8 megacycles and correspondingly modified low-pass and high-pass filters 134 and 136 respectively take the place of the filters 124 and 126 in the 8 megacycle switch initiator channel.

The spare channel switch initiator thereby produces a direct current output on one output lead whenever the 9 megacycle pilot fails to meet the established standards indicating that the spare channel is not in operating condition and a second output appearing on a separate output lead and providing the same information, as to the 8 megacycle pilot frequency normally associated with the working channels but transmitted over the spare channel whenever the two are connected together at the transmitting or head end of a switching section. It is the disappearance of pilot output associated with the 9 megacycle switch initiator channel and the appearance of an output for the 8 megacycle channel of the same switch initiator which indicates that the switching operation has been completed at the head end of a switching section.

As shown in Fig. 3 the output leads of the several switch initiators are connected through the windings of one or more relays which remain unoperated or release as the case may be when the appropriate pilot signal is received indicating a usable transmission facility and operate when degradation of the pilot signal indicates that the corresponding facility has failed. The relay circuits associated with the switch initiators (Fig. 3) and those employed at the transmitting terminal (Fig. 2) are shown in the unoperated condition, that is, the contacts of the several relays are shown as occupying the positions which correspond to the absence of current flow in the relay windings.

Under normal conditions of operation of the radio relay system, working channels 1 and 2 as well as the spare or protection channel are in satisfactory operating condition and as a result no current flows in the output leads of the working channel switch initiator 112 or in the output lead 116 of spare channel initiator 114. Since under these conditions the spare channel is not connected at the transmitting end of the switching section to any of the working channels, no working channel pilot signal is transmitted over the spare channel and as a consequence current flows in output lead 118 of initiator 114. Therefore, under normal transmission conditions relay 120, the winding of which is connected to lead 118 from the spare channel initiator is operated while the relays connected to the remaining initiator outputs remain in the unoperated condition as shown in the drawing.

The output lead of initiator 112 for the first working channel is connected through the winding of control relay 122 thence through the winding of a gating relay 124 for channel 1 and through a back contact of gating relay 126 for working channel 2 to a ground lead 128. In similar fashion the output lead of the initiator for working channel 2 is connected through the winding of a control relay 130 for that working channel, thence through the winding of gating relay 126 and a back contact of gating relay 124 to ground lead 128.

The output lead 116 of the spare channel initiator 114 is connected through the winding of an interlock relay 132 to ground.

Control relays 122 and 130 respectively are arranged to control receiver switches 102 and 106 and when operated complete circuits through front contacts to a power lead 134, current from which may then flow through the winding of the associated switching relay to change the radio frequency circuit connections. Relay 120 is normally operated since no regular channel pilot is received over the spare channel. A battery 138 is arranged to supply current to power lead 134 through the upper back contact of relay 120 while lead 128 is grounded through the lower back contact of relay 120. When the transmission channels are in satisfactory condition relay 120 is operated as has been pointed out above and these connections are broken.

Let it now be assumed that transmission over the first working channel becomes degraded to such an extent that a switch to the spare channel is indicated. Current flow in the output lead of switch intiator 112 for this channel causes operation of control relay 122 which acts to connect the winding of switching relay 102 to power lead 134 through the front contact of relay 122. Inasmuch as relay 120 associated with the working channel output lead 118 of the spare initiator 114 is operated, battery 138 remains disconnected from power lead 134 and the action of relay 122 is only preparatory in nature.

The output current of switch initiator 112 for the first channel also flows through the winding of gate relay 124, thence through the back contact of gate relay 126 and the back contact of interlock relay 132 to ground, causing relay 124 to operate. This relay in operating closes a circuit over a front contact to connect a tone oscillator 140 through an isolating resistor 142 to the wire line extending to the head end of the switching system. At the same time the circuit including the winding of gate relay 126 for the second working channel and extending through the back contact of relay 124 is interrupted so that no other request for use of the spare channel facility may be transmitted over the wire line. Finally, the transfer contacts of relay 124 are operated to remove ground from lead 144 and to complete a locking circuit to ground for gating relay 124.

Under these conditions the output of tone oscillator 140 is applied to the wire line. This oscillator may be of any convenient type and is arranged to produce a single frequency tone falling within the voice frequency range which serves to identify the first working channel. This tone is employed to initiate operation of the switching circuits at the head end of the switching section.

If working channel 2 fails rather than working channel 1 a similar train of switching steps is initiated. Relay 130 is operated to close a preparatory circuit to the winding of receiver switch 106 from power lead 134. At the same time the channel 2 gate relay 126 is operated and in operating opens the actuating circuit of gate relay 124 to prevent simultaneous operation thereof. In addition the output of a second tone oscillator 145 which is similar to tone oscillator 140 but is arranged to operate at a different frequency in the voice frequency band is connected through a front contact and an isolating resistor 146 to the wire line and a locking circuit for the channel to gate relay 126 is completed to ground through a front contact of gate relay 126 and the transfer contact of gate relay 124. From the above it will be understood that once one of the gate relays has operated to send a switching control signal to the head end of the switching section no other gate relay can operate. Similarly operation of the control relays associated with the working channel initiators and arranged to prepare circuits for the operation of the receiver switches is limited so that only one receiver switch can be prepared for operation. The interlock circuit is of conventional form and it will be understood that if additional working channels are added to the system similar interlocking connections between the corresponding gate relays must be provided. Similarly additional tone oscillators each tuned to a different frequency identifying the respective additional working channels must be added to the system.

When the spare channel has been connected to or bridged upon the failed working channel at the head end of the switching section, as will be described in greater detail below, the 9 megacycle spare pilot tone disappears from the output of spare radio receiver 98 and is replaced by the 8 megacycle tone derived from the frequency modulator of the failed working channel. If it is assumed that the first working channel has failed and that relays 122 and 124 have operated as outlined above, the switch in pilot tones will have the following effects. First the regular or working channel pilot is received by switch initiator 114 causing release of relay 120. This serves to connect battery 138 through a back contact to power lead 134 and consequently the previously prepared circuit including the front contact of relay 122 is completed causing current to flow in the winding of receiver switch 102. Operation of receiver switch 102 disconnects output lead 148 of the first working channel radio receiver 96 from the lead extending to output terminal 100 and transfers the last mentioned lead to a bridging circuit 150. At the same time the other transfer accomplished by receiver switch 102 disconnects lead 152 of the spare channel from the circuit extending to spare channel output 110 and connects it to bridging circuit 150. The message information transmitted over the spare radio channel therefore appears at output terminal 100 for the first working channel and may be applied to subsequent communication circuits.

Release of relay 120 also serves by virtue of the connection of battery 138 to power lead 134 to operate resupply switch 108. Operation of this switch serves to interrupt the spare channel circuit extending from the lower back contact of receiver switch 102 to output terminal 110 for the spare channel and to connect the major portion of this circuit to a termination 154. At the same time the output lead 156 of the pilot resupply oscillators (60 and 62 Fig. 1) is connected to spare channel output terminal 110.

The transfer of pilot signals on the spare channel also serves to produce a flow of current through output lead 116 of the spare channel initiator. This current, the presence of which indicates that the spare channel is busy or has failed, causes operation of interlock relay 132 interrupting the ground connection normally existing through the back contact of relay 132. This is of no immediate effect, however, since the release of relay 120 has served to connect ground lead 128 to ground through the lower back contact of that relay. It will be understood, however, that if the spare channel should fail after a switch has been completed an output current would flow over lead 118 indicating the absence of the working channel pilot signal and would cause control relay 120 to operate, removing this additional ground connection. Under these conditions no further request can be made for the use of the spare channel by other working channels even though the failed working channel is restored to service, since no operating circuit can be completed for any of the gate relays. This action, however, does not cause the gate relay or the control relay associated with the first working channel to release since the operating circuit for these relays is completed through the locking circuit previously described.

When the first working channel is restored to service output current ceases to flow from the associated initiator 112. This causes relays 122 and 124 to release restoring the various circuits at the receiving station to their normal condition. At the same time transfer of the pilot signal transmitted over the spare channel from that associated with a working channel to that normally transmitted over the spare channel causes relay 132 to release and relay 120 to operate with the result that all of the switching circuits are restored to the normal condition and a subsequent failure either on the first working channel or on the second working channel may operate in the manner described above to initiate a second switching operation.

From the above it will be understood that operation of the control circuits at the receiving station in response to the failure of a working channel serves to apply a tone signal identifying the failed channel to the return path facility extending to the transmitting terminal of Fig. 2. This facility is connected through isolating resistors 160 and 162 to the inputs of control channels, each including a band-pass filter 164 arranged to pass only one of the control tones and a detector 166 which may, for example, comprise a thyratron type trigger circuit arranged to be operated when the corresponding one of the switching tones is received. The wire line is also connected through a broad-band filter 168 to a vacuum tube detector 170 arranged to draw current through the winding of a slow release relay 172. The receipt of any switching tone over the wire line causes relay 172 to operate to connect a battery 174 through its front contact to a common power lead 176. This battery serves as a source of operating current for the thyratron detectors 166, that for the first working channel being connected to the power lead through the winding of a relay 178 and that for the second working channel being connected to the same lead through the winding of a relay 180. It will be understood that due to the provision of interlocking circuits at the receiving end of the switching section, only one tone may be sent over the wire line at a time. Therefore, slow release relay 172 and either control relay 178 or control relay 180, but not both, may be operated. If it is assumed that failure has occurred on the first working channel, the identifying tone transmitted to the head end of the system will traverse the appropriate band-pass filter and detector causing operation of relay 178. This relay, upon operating, connects the winding of the channel one transmitter switch 86 to a battery 196, causing operation of the transmitter switch to disconnect the output of the frequency modulator for the spare channel from lead 182 and to connect the frequency modulator 74 for the first working channel through the front contacts of the switch to the same lead. Thus the output of the first working channel modulator 74 is connected through the front contacts of transmitter switch 86 to lead 182, thence through the lower back contact of transmitter switch 88 for the second working channel to the spare channel transmitter 82. If, on the other hand, the second working channel fails, relay 180 is operated and acts to connect battery 186 to the winding of transmitter switch 88 for the second working channel and this switch upon operating serves to transfer the output of the frequency modulator for the second working channel to the input of radio transmitter 82.

If the return path facility fails, or if the failed working channel is restored to service, no control signal tones reach the head end of the switching section over the return path and relay 172, which is a slow release device, acts after an interval determined by its characteristics to disconnect battery 174 from power lead 176. Thereupon the operated thyratron of the detector 166 corresponding to the working channel which had failed is extinguished and the switching equipment at the transmitting end of the switching section is restored to its normal standby condition.

What is claimed is:

1. In a communication system, transmitting and receiving stations, at least one working channel linking said stations, a spare channel also linking said stations, switches at each station to permit substitution of the spare channel for a failed working channel, means at the transmitting station for applying a first pilot signal to each working channel and for applying a different pilot signal to the spare channel, means at the receiving station for each channel and operative in response to a specified change in a selected characteristic of the first pilot signal for actuating said switch at the transmitting station to connect the spare channel to the associated working channel and means at the receiving station and responsive to the first pilot signal transmitted over the spare channel when connected to a working channel for actuating the switch at the receiving station to substitute the output of the spare channel for that of the failed working channel.

2. In a communication system, transmitting and receiving stations, at least one working channel linking said stations, a spare channel also linking said stations, switches at each station to permit substitution of the spare channel for a failed working channel, means at the transmitting station for applying a first pilot signal to each working channel and for applying a second pilot signal to the spare channel, means at the receiving station for each working channel and responsive to the condition of failure of the first pilot signal and to the condition of a decrease in the ratio of the first pilot signal to noise in a band centered thereabout as transmitted over the associated working channel to actuate said switch at the transmitting station to connect the spare channel to the failed working channel upon the occurrence of either of said conditions and means at the receiving station operative in response to the operation of said switch at the transmitting station for actuating the switch at the receiving station to substitute the output of the spare channel for that of said failed working channel.

3. In a communication system, transmitting and receiving stations, at least one working channel linking said stations, a spare channel also linking said stations, switches at each station to permit substitution of the spare channel for a failed working channel, means at the transmitting station for applying a first pilot signal to each working channel, and for applying a second pilot signal to the spare channel, means at the receiving station for each working channel and operative in response to the condition of failure of the pilot signal or the condition of decrease in the ratio of pilot signal to noise in a band centered thereabout for actuating said switch at the transmitting station to connect the spare channel upon the occurrence of either of said conditions to the failed working channel, and means at the receiving station and responsive to the change in pilot signal transmitted over the spare channel when connected to a working channel for actuating the switch at the receiving station to substitute the output of the spare channel for that of the working channel.

4. In a communication system, transmitting and receiving stations, at least one working channel linking said stations, a spare channel also linking said stations, switches at each station to permit substitution of the spare channel for a failed working channel, means at the transmitting station for applying a first pilot signal to each working channel and for applying a second pilot signal to the spare channel, means at the receiving station for each working channel for detecting failure of the first pilot signal to be satisfactorily received over the working channel and effective to operate the switch at said transmitting station to connect the spare channel to the failed working channel, means at the transmitting station responsive to the operation of said switch for changing the pilot signal applied to said spare channel to the first pilot signal and means responsive to receipt of the first pilot signal over the spare channel at said receiving station for connecting the output of the spare channel in place of that of the failed working channel.

5. In a communication system, transmitting and receiving stations, at least one working channel linking said stations, a spare channel also linking said stations, switches at each station to permit substitution of the spare channel for a failed working channel, means at the transmitting station for applying a first pilot signal to each working channel and for applying a second pilot signal to the spare channel, means at the receiving station for each working channel and responsive to a predetermined change in a selected characteristic of said first pilot signal for actuating said switch at the transmitting switch to connect the spare channel to the failed working channel, means at the receiving station responsive to the change in pilot signal transmitted over the spare channel when connected to a working channel for actuating the switch at the receiving station to complete the substitution of the spare channel for the failed working channel and means responsive to failure of any pilot signal to be received over said spare channel for returning said switches to their initial condition.

6. In a communication system, transmitting and receiving stations, at least one working channel linking said stations, a spare channel also linking said stations, switches at each station to permit substitution of the spare channel for a failed working channel, means at the transmitting station for applying a first pilot signal to each working channel and for applying a second pilot signal to the spare channel, control means at the receiving station for each working channel and operative in response to a predetermined change in said first pilot signal for controlling operation of said switch at the transmitting station to connect the spare channel to the failed working channel, means at the receiving station and associated with said spare channel for interrupting the operation of said control means whenever a pilot signal fails to be received over said spare channel, and means responsive to the change in pilot signal transmitted over the spare channel upon connection to a working channel for actuating the switch at the receiving station to complete the substitution of the spare channel for the failed working channel.

7. In a communication system, transmitting and receiving stations, at least one working channel linking said stations, a spare channel also linking said stations and an auxiliary control channel linking said stations, switches at each station to permit substitution of the spare channel for a failed working channel, means at the transmitting station for applying a first pilot signal to each of said working channels and for applying a different pilot signal to the spare channel, means at the receiving station for each working channel and responsive to a specified change in said first pilot signal for applying a control signal characteristic of the failed working channel to said auxiliary channel, means at the transmitting station and responsive to said characteristic signal transmitted over said auxiliary channel for operating the switch at said transmitting station to connect the spare channel to the failed working channel and means at the receiving station and responsive to the change in pilot signal transmitted over the spare channel produced by connecting the spare channel to the working channel at the transmitting station for operating the switch at the receiving station to substitute the output of the spare channel for that of the failed working channel.

8. In a communication system, transmitting and receiving stations, at least one working channel linking said stations, a spare channel linking said stations and a return circuit connecting said receiving station to said transmitting station, switches at each station to permit substitution of the spare channel for any failed working channel, means at the transmitting station for applying a first pilot signal to each working channel and a second pilot signal to the spare channel, means at the receiving station for generating a distinctive control signal identifying each working channel, means also at the receiving station for each working channel and responsive to a specified change in the first pilot signal received over the associated working channel for connecting the output of said generating means corresponding to the failed channel to said return circuit for transmission to said transmitting station, means at the transmitting station and responsive to the receipt of said control signal for operating said switch to connect the spare channel to the appropriate working channel identified by said control signal and means at the receiving station and responsive to the change in pilot signal occurring upon connection of the spare channel to the working channel for substituting the output of the spare channel for that of said working channel.

9. In a communication system, transmitting and receiving stations, at least one working channel linking said stations, a spare channel also linking said stations and a return channel extending from said receiving station to said transmitting station, switches at each station to permit substitution of the spare channel for any failed working channel, means at the transmitting station for applying a first pilot signal to each working channel and a second pilot signal to the spare channel, means at the receiving station for producing a characteristic control quantity for each working channel, means also at the receiving station and responsive to failure of said first pilot signal to be received over a working channel for applying said control quantity for that working channel to said return circuit, means at transmitting station and responsive to said control quantity transmitted over said return circuit for actuating said switch to connect the spare channel to that failed working channel, means responsive to the change in pilot signal received over said spare channel by reason of the connection of the spare channel to the failed working channel for actuating the switch at said receiving station to complete the substitution of the spare channel for the failed working channel and means for returning said switches to their initial condition in the event of failure of said return circuit.

10. In an automatic switching system for a communication system including a plurality of working channels and a spare channel linking terminal stations through a plurality of stations defining switching sections arranged in tandem, means at the terminal station at the transmitting end of the system for applying a first pilot signal to each working channel and a different pilot signal to the spare channel, switching means at the stations at either end of a switching section for substituting the spare channel for a failed working channel, means at the switching station at the receiving end of each section and responsive to failure of said first pilot signal for a particular working channel for operating the switch at the station at the head end of the section to connect the spare channel to that particular working channel, means at the switching station at the other end of the section and responsive to receipt over the spare channel of said first pilot signal for operating the switch at the receiving end of the section to complete the substitution of the spare channel for the failed working channel in that section, and means at the receiving station of each section for applying a pilot signal effectively the same as said second pilot signal to the spare channel of the next succeeding section whenever the spare channel of a switching section is employed to make good a working channel that has failed in that section.

11. In a communication system comprising a plurality of switching sections connected in tandem, transmitting and receiving stations for each of said sections at least one working channel linking said stations, a spare channel also linking said stations, switches at each station to permit substitution of the spare channel for a failed working channel, means at the transmitting station of the first of said switching sections for applying a first pilot signal to each working channel and for applying a different pilot signal to the spare channel, means at the receiving station of each of said sections and operative in response to a specified change in a selected characteristic of the first pilot signal for actuating the switch at the transmitting station of the respective section to connect the spare channel to the associated working channel, means at each receiving station and responsive to the first pilot signal transmitted over the spare channel when connected to a working channel for actuating the switch at the receiving station to substitute the output of the spare channel for that of the failed working channel and means at each receiving station operable upon completion of a switch in the preceding section for applying to the spare channel of the next succeeding section a pilot signal effective as a substitute for said second pilot signal at the receiving station of said succeeding section.

12. In a communication system comprising a plurality of switching sections, each comprising a transmitting and receiving station, said sections being connected in tandem between terminal stations, at least one working channel linking the transmitting and receiving stations of each section, a spare channel also linking said stations, switches at each transmitting and receiving station to permit substitution of the spare channel for a failed working channel, means at the transmitting station of the first section for applying a first pilot signal to each working channel, and a second pilot signal to the spare channel, means at each receiving station for each channel and operative in response to a specified change in the first pilot signal as received over a working channel for operating the switch at the transmitting end of said section to connect the spare channel to a failed working channel, means at the receiving station of that section and responsive to the change in pilot frequency transmitted over the spare channel when connected to a working channel for actuating the switch at the receiving station to substitute the output of the spare channel for that of the working channel, means at the receiving station for producing an auxiliary pilot signal effectively the same as said second pilot signal and means responsive to the change in pilot frequency received over the spare channel substituted for a failed working channel for connecting said auxiliary pilot signal to the transmitting station of the next succeeding switching section.

13. In automatic switching apparatus for a communication system including working channels and a spare channel linking a terminal station including a frequency modulator for each of said channels and a plurality of switching stations in tandem each having means for amplifying for retransmission frequency modulated signals from the preceding station, switching means at each station for substituting the spare channel for a failed section of a working channel, means at said terminal station for applying different pilot signals to the modulator for said spare channel and to those for said working channels, control means for the switching means at each switching station responsive to failure of the pilot signal to be received over a working channel to substitute the spare channel for that working channel and including a frequency modulation receiver comprising at least a limiter and discriminator for each channel, and means for providing a pilot signal for sections of said spare channel following a section switched to make good a working channel comprising means at each switching station operative when the spare channel of the preceding section is switched to apply to the next succeeding section of the spare channel two signals of frequencies falling within the transmission band of said comunication system and differing by the frequency of the pilot signal for said spare channel.

14. In automatic switching apparatus for a communication system including working channels and a spare channel linking a transmitting terminal station and a plurality of switching stations in tandem each having means for amplifying for retransmission to the next station signals received from the preceding station, switching means at each station for substituting the spare channel for a failed working channel between adjacent stations, means at said transmitting terminal station for applying different pilot signals to the spare channel and the working channels, control means at each station responsive to unsatisfactory reception of the pilot signal over a working channel to actuate the switching means at each switching station and means responsive to seizure of the spare channel in the preceding inter-station link for applying a substitute pilot signal to the succeeding portion of the spare channel.

15. In automatic switching apparatus for a communication system including working channels and a spare channel linking a terminal station including a frequency modulator for each of said channels and a plurality of switching stations connected in tandem by switching sections of said channels and each having means for retransmission of frequency modulated signals from the preceding station, switching means at each station for substituting the spare channel in any section for a failed working channel in that section, means at the terminal station for applying different pilot signals to the modulator for said spare channel and those for said working channels, control means for said switching means at each station acting in response to degradation of the received pilot signal on a working channel and the continued receipt of the pilot signal on the spare channel to actuate the channel substitution switches for the failed section means at each switching station operative when preceding section of spare channel is switched to apply to the succeeding section of spare channel two signals of frequencies falling within the band of said communication system and differing by the frequency of the pilot signal for said spare channel and means at each switching station for deriving a control signal of the frequency of the pilot signal for the spare channel for said control means at said station.

References Cited in the file of this patent

UNITED STATES PATENTS

| | | |
|---|---|---|
| 1,709,076 | Jammer | Apr. 16, 1929 |
| 2,271,000 | Lovell | Jan. 27, 1942 |